United States Patent
Pedercini

(10) Patent No.: US 9,862,515 B2
(45) Date of Patent: Jan. 9, 2018

(54) CAROUSEL FOR PROCESSING CONTAINERS

(71) Applicant: SACMI VERONA S.P.A., Imola (IT)

(72) Inventor: Maurizio Pedercini, Marmirolo (IT)

(73) Assignee: SACMI VERONA S.P.A., Imola (IT)

( * ) Notice: Subject to any disclaimer, the term of this patent is extended or adjusted under 35 U.S.C. 154(b) by 0 days.

(21) Appl. No.: 15/313,061

(22) PCT Filed: May 15, 2015

(86) PCT No.: PCT/EP2015/060788
§ 371 (c)(1),
(2) Date: Nov. 21, 2016

(87) PCT Pub. No.: WO2015/177055
PCT Pub. Date: Nov. 26, 2015

(65) Prior Publication Data
US 2017/0183116 A1    Jun. 29, 2017

(30) Foreign Application Priority Data
May 21, 2014    (IT) .............................. VR2014A0141

(51) Int. Cl.
*B65G 47/24* (2006.01)
*B65C 9/06* (2006.01)
(Continued)

(52) U.S. Cl.
CPC ............... *B65C 9/067* (2013.01); *B67B 3/26* (2013.01); *B67C 3/007* (2013.01); *B67C 3/22* (2013.01);
(Continued)

(58) Field of Classification Search
CPC .. B65G 35/58; B65G 47/2445; B65G 47/244; B65G 29/00; B65G 2201/0244; B65G 43/50; B65G 9/06; B67B 3/26; B67C 3/00
(Continued)

(56) References Cited

U.S. PATENT DOCUMENTS 3,690,456 A * 9/1972 Powers, Jr. ........ G01N 21/9009
                                                                198/379
4,143,754 A * 3/1979 Eldred ...................... B65C 9/06
                                                                198/377.06
(Continued)

FOREIGN PATENT DOCUMENTS

DE    1805010 B1    4/1970
EP    0635452 A1    1/1995
(Continued)

OTHER PUBLICATIONS

International Search Report dated Aug. 11, 2015 re: Application No. PCT/EP2015/060788; pp. 1-3; citing: DE 18 05 010 B1, WO 2012/090093 A1 and FR 1 539 990 A.
(Continued)

*Primary Examiner* — James R Bidwell
(74) *Attorney, Agent, or Firm* — Cantor Colburn LLP

(57) ABSTRACT

A carousel for processing containers includes a base structure that can rotate about the rotation axis of the carousel and supports a plurality of supporting elements. A detection device is provided having at least one sensor that can move about the rotation axis of the carousel. The carousel further includes a plurality of kinematic connection elements arranged between the base structure and the sensor or sensors, which are adapted to couple integrally in rotation the sensor or sensors and the base structure during the movement of the sensor or sensors. The kinematic connection elements are associated with motor elements adapted to
(Continued)

return on command the sensor or sensors from a final angular position to the initial angular position by way of an angular movement of the sensor or sensors in the opposite direction with respect to the rotation of the base structure.

10 Claims, 3 Drawing Sheets

(51) Int. Cl.
*B67B 3/26* (2006.01)
*B67C 3/00* (2006.01)
*B67C 3/22* (2006.01)
*B65C 9/44* (2006.01)
*B65G 47/244* (2006.01)

(52) U.S. Cl.
CPC .............. *B65C 9/44* (2013.01); *B65G 47/244* (2013.01); *B65G 47/2445* (2013.01)

(58) Field of Classification Search
USPC .................................... 198/376, 377.06, 379
See application file for complete search history.

(56) References Cited

U.S. PATENT DOCUMENTS

| 5,121,827 A * | 6/1992 | Ribordy | B65C 9/04 |
| | | | 198/377.06 |
| 5,810,955 A * | 9/1998 | Seifert | B65C 9/067 |
| | | | 198/376 |
| 6,581,751 B1 * | 6/2003 | Nickey | B65G 47/847 |
| | | | 198/379 |
| 8,978,552 B2 * | 3/2015 | Preckel | B41J 3/4073 |
| | | | 198/379 |
| 2015/0083550 A1 * | 3/2015 | Wilson | B65G 47/80 |
| | | | 198/376 |

FOREIGN PATENT DOCUMENTS

FR       1539990 A       9/1968
WO       2012090093 A1   7/2012

OTHER PUBLICATIONS

Written Opinion dated Aug. 11, 2015 re: Application No. PCT/EP2015/060788; pp. 1-5; citing: DE 18 05 10 B1 and WO 2012/090093 A1.

* cited by examiner

CAROUSEL FOR PROCESSING CONTAINERS

CROSS-REFERENCE TO RELATED APPLICATIONS

This application is related to and claims the benefit of Italian Patent Application No. VR2014A000141, filed on May 21, 2014, the contents of which are herein incorporated by reference in their entirety

TECHNICAL FIELD

The present disclosure relates to a carousel for processing containers, and in particular, a carousel provided with a device for detecting the orientation of the containers.

BACKGROUND

Carousels for processing containers are known and are widely used which comprise a plurality of pans for supporting respective containers to be processed, which are positioned at the peripheral region of the carousel and to which the containers are supplied.

The carousel can be associated with various different types of stations for processing the containers in order to carry out, for example, the filling of the containers, the stoppering or the labeling.

In some applications it is necessary to detect the orientation of the container arranged on the pan in order to be able to carry out the operations required at a preset angular portion of the container.

In the majority of cases, the carousels are provided with devices for the detection of the orientation of the containers which comprise, for each pan, a respective sensor designed to detect, during the rotation of the container on the respective pan, a distinctive indicator constituted for example by a ridge, a notch, a so-called "spot", etc.

Once the sensor has detected the distinctive indicator, a data processing device connected therewith acquires the signal and associates it with the angular position of the pan at that moment.

Typically each sensor is connected to the carousel by way of a supporting bracket so as to follow the respective container during the rotation of the carousel.

Such solution, although widely used, suffers a number of drawbacks, which in particular are determined by the need to use an extremely high number of sensors and supporting brackets.

This results in the need, in the event of a change of format, to carry out an extremely high number of adjustments on the sensors.

Furthermore, the sensors must often be mobile with respect to the container in order to not impede the processing operations (such as for example the labeling).

Likewise, solutions are known in which the carousel is associated with one or more sensors which are designed to follow, for a certain angular portion, a respective container in order to detect its orientation in order to then bring it into the initial position so as to be able to detect the orientation of a further container arranged upstream in the direction of advancement of the carousel.

A solution of this type is described and illustrated in French patent application no. 2012430 in the name of Firma Otto Sick Metallwarenfabrik.

In such solution the carousel supports rotatably, about its own main rotation axis, a bracket for supporting a sensor, which extends externally to the carousel.

Along the peripheral region of the carousel are advancement elements designed to entrain the bracket in rotation from an initial position for a preset angular portion that is adapted to allow the detection of the orientation of the container.

At the end of the angular portion, the bracket "disengages" from the advancement element and, thanks to the action of a return spring and a stroke limit, it is brought back to the initial position at which it "engages" another advancement element.

Such solution, while conceptually valid, suffers considerable drawbacks in technical and implementation terms.

In fact, as the rotation speed increases, it is extremely problematic to ensure the precision and reliability of the step of engaging the bracket with the advancement elements.

Furthermore, repositioning the bracket by way of the return spring and the mechanical holdback is also problematic from the point of view of precision.

EP 0635452 discloses a carousel provided with an apparatus for the application of sealing capsules on wine bottles, such carousel being provided with optical readers for detecting the orientation of the capsules.

In this case the optical readers are entrained, thanks to the action of a motor with a shaft arranged coaxially to the axis of the carousel, in an alternating back-and-forth motion along a preset angular portion so that, in the outward portion, the angular speed of the optical readers corresponds to that of the container to be monitored.

Lastly, a solution has recently been proposed, disclosed in WO2012/090093, relating to a detection device for containers in motion on a carousel conveyor, which comprises a supporting structure and at least one detection sensor which is connected to the supporting structure and can move with respect thereto.

Such detection device further comprises means of synchronization of the sensor with respect to the container, in order to move it so that the sensor follows the container along at least a part of the advancement path from an initial angular position to a final angular position.

Specifically, the synchronization means comprise a guide, fixed to the supporting structure, and a movable structure mounted slideably on the guide and comprising a closed annular transmission element on which at least one sensor is connected.

In particular, the sensor is fixed to the movable structure in order to move at least from the initial position to the final position.

Such solution suffers the drawback of needing specific means for synchronizing the movement of the sensors with that of the container during the movement of the supporting bracket along the advancement path from the initial angular position to the final angular position.

SUMMARY

The aim of the present disclosure is to solve the above mentioned problems and overcome the above drawbacks, by providing a carousel for processing containers which is considerably easier and more practical to use in respect of the conventional machines used today.

Within this aim, the disclosure provides a carousel for processing containers which is fitted with a device for detecting the orientation of the containers which is extremely precise and reliable in its operation.

The disclosure further provides a carousel for processing containers which makes it possible to appreciably limit the overall encumbrances.

The disclosure also provides a carousel associated with a device for detecting the orientation of the containers which uses a limited number of sensors so as to appreciably reduce the time necessary for the substitution and/or adjustment of the sensors for example following a change of format.

These features and advantages which will become better apparent hereinafter are achieved by providing a carousel for processing containers according to claim 1.

BRIEF DESCRIPTION OF THE DRAWINGS

Further characteristics and advantages of the disclosure will become better apparent from the description of some preferred, but not exclusive, embodiments of a carousel for processing containers according to the disclosure, which are illustrated by way of non-limiting example in the accompanying drawings wherein.

Figure 1:
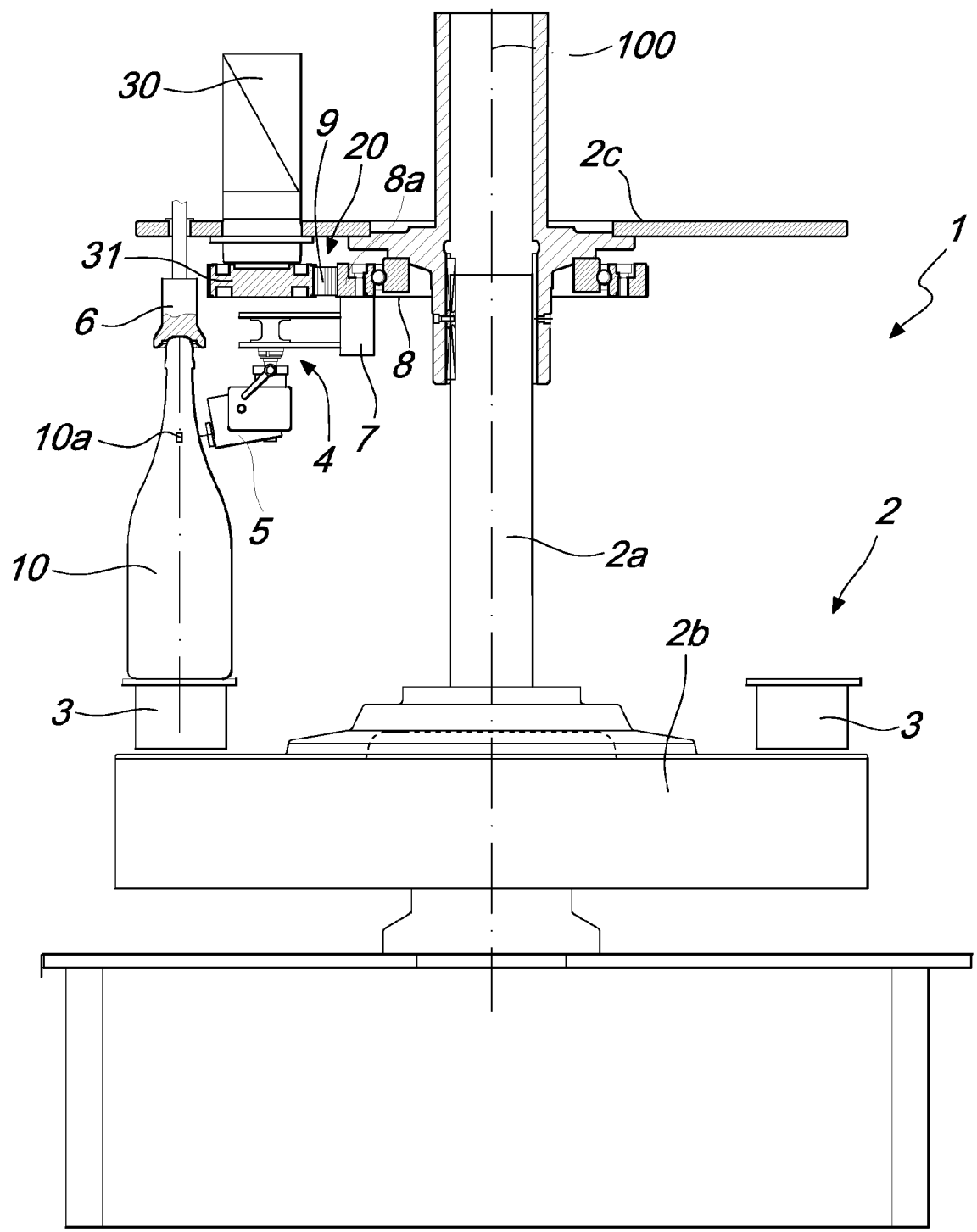
FIG. 1 is a cross-section taken along a diametrical plane of a practical embodiment of the carousel according to the disclosure.

In the embodiments illustrated, individual characteristics shown in relation to specific examples may in reality be interchanged with other, different characteristics, existing in other embodiments.

DETAILED DESCRIPTION OF THE DRAWINGS

With reference to the figures, the present disclosure relates to a carousel, generally indicated with the reference numeral 1, for processing containers.

The carousel 1 comprises a base structure 2, which can rotate about the rotation axis 100 of the carousel 1.

The base structure 2 supports a plurality of supporting elements 3 which are mutually angularly spaced apart and are designed to support a respective container 10 to be processed.

Advantageously, the base structure 2 is provided with a central movement body 2a, which extends parallel to the rotation axis 100 and is connected, below, to a lower footing 2b.

The lower footing 2b supports, conveniently at its peripheral region, the supporting elements 3.

The containers 10 to be processed are fed to the carousel 1 by a feeding device 40.

Conveniently, the feeding device 40 can comprise a feeding star conveyor.

Advantageously, the containers 10 processed during their movement on the carousel 1 are unloaded therefrom by way of an unloading device 50.

The unloading device 50 comprises, for example, an unloading star conveyor.

The base structure 2 is associated with at least one device 4 for detecting the orientation of the containers 10 carried by the supporting elements 3.

The detector device 4 comprises at least one sensor 5 that can move about the rotation axis 100 of the carousel 1 between an initial angular position and a final angular position and vice versa.

The final angular position is arranged downstream of the initial angular position in the direction of rotation 200 of the base structure 2 about the rotation axis 100 of the carousel 1.

Figure 2:
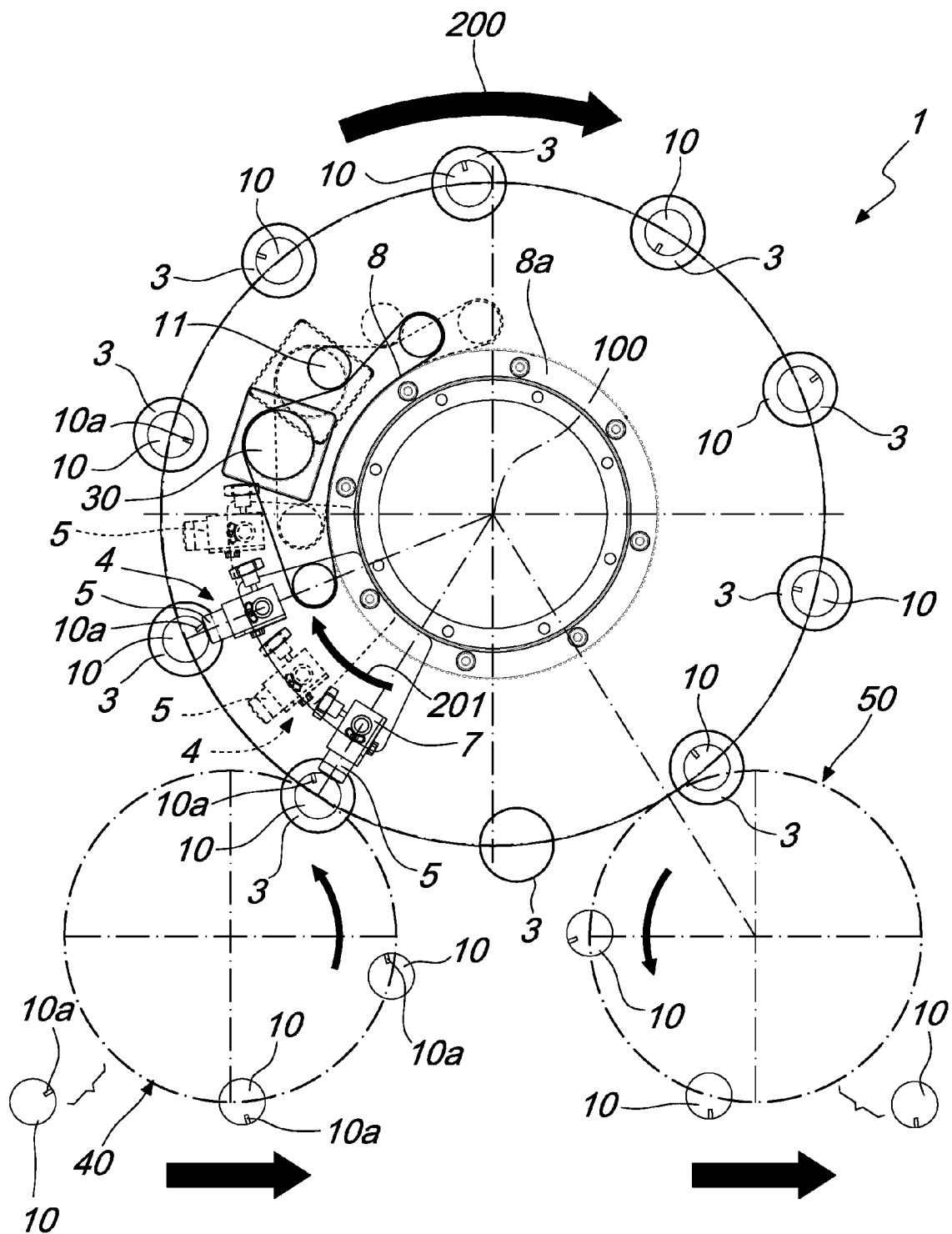
FIG. 2 is a schematic view from above of the carousel shown in FIG. 1 during the step of moving the sensor from the initial angular position to the final angular position.

During the movement from the initial angular position to the final angular position (indicated by the arrow 201 in FIG. 2), the (or each) sensor 5 is functionally associated with a container 10, which can move about the rotation axis 100 of the carousel 1, in order to detect a feature, for example a so-called "spot" 10a, of the container 10.

During such movement, the container 10 is in fact supported in rotation about its own longitudinal axis, substantially parallel to the rotation axis 100, typically by way of a rotation of the respective supporting element 3, which for example is constituted by a pan.

During the step of detection of the orientation, the rotation speed of the supporting element 3, and thus of the container 10, about its own axis is such as to allow at least one rotation of 360° during the movement of the sensor or sensors 5 from the initial angular position to the final angular position.

Obviously, if the sensor 5 detects the characteristic 10a of the container 10 after an angular rotation of the container 10 less than a full revolution, the rotation of the supporting element 3 can also be interrupted.

Once the sensor 5 has detected the feature of the container 10, a data processing device connected thereto acquires the signal and associates it with the angular position of the supporting element 3 at that moment, optionally locking the rotation of the supporting element 3 or commanding the rotation thereof in order to bring the feature 10a to a preset angular position adapted to the processing to be carried out.

According to the present disclosure, the carousel 1 comprises kinematic connection means 20 arranged between the base structure 2 and the (or each) sensor 5.

The kinematic connection means 20 are adapted to couple integrally in rotation the (or each) sensor 5 with the base structure 2, and advantageously with an upper flat disc 2c that rotates integrally with the central movement body 2a, during the movement of the sensor or sensors 5 between the initial angular position and the final angular position.

The kinematic connection means 20 are further associated with motor means 30, which are adapted to return, on command, the sensor or sensors 5 from the final angular position to the initial angular position by way of an angular movement of the sensor or sensors 5 in opposite direction (indicated in FIG. 3 with the arrow 202) with respect to the rotation of the base structure 2 about the rotation axis 100 of the carousel 1.

According to a further aspect of the present disclosure, the motor means 30 are supported by the base structure 2.

In particular, the motor means 30 comprise an actuation motor which comprises a motor body supported by the base structure 2 and which can move by rotation together with the base structure 2 about the axis 100 of the carousel 1.

The carousel 1 is associated with at least one station or with at least one apparatus for the processing of the containers.

For the purposes of example, such station or apparatus can comprise at least a unit for labeling the containers 10, a filling unit or a stoppering unit.

Conveniently, such station or apparatus is arranged along the carousel 1 between the final angular position and the unloading device 50.

Advantageously, the sensor or sensors 5 are supported by a supporting element 8.

The supporting element 8, or at least a part thereof, can rotate with respect to the base structure 2 about the rotation axis 100 of the carousel 1 in a back and forth motion.

For the purposes of example, the supporting element 8 comprises a center bearing.

Delving deeper into the details, the kinematic connection means 20 comprise an element 9 for kinematic connection between a first portion 8a of the supporting element 8, conveniently the outer body of the center bearing, extended around the rotation axis 100 of the carousel 1, and an actuation body 31 supported by the base structure 2 and rotatable, together therewith, about the rotation axis 100 of the carousel 1.

In particular, the kinematic connection element 9 connects, effectively rigidly when the motor means 30 are not actuated, the first portion 8a of the supporting element 8 to which the sensors 5 are connected, with the base structure 2.

In practice, when the motor means 30 are not actuated, the base structure 2 is adapted to entrain in rotation the first portion 8a of the supporting element 8, and thus the sensor or sensors 5 supported thereby, at the same angular speed as the base structure 2 in order to result in the movement of the sensor or sensors 5 from the initial angular position to the final angular position.

Advantageously, the actuation body 31 can be actuated by the motor means 30 in order to move, on command, the first portion 8a of the supporting element 8 in rotation in the opposite direction (in the direction of the arrow 202) with respect to the rotation (indicated with the arrow 200) of the base structure 2 about the rotation axis 100 of the carousel 1 so as to allow the passage of the sensor or sensors 5 from the final angular position to the initial angular position.

Figure 3:
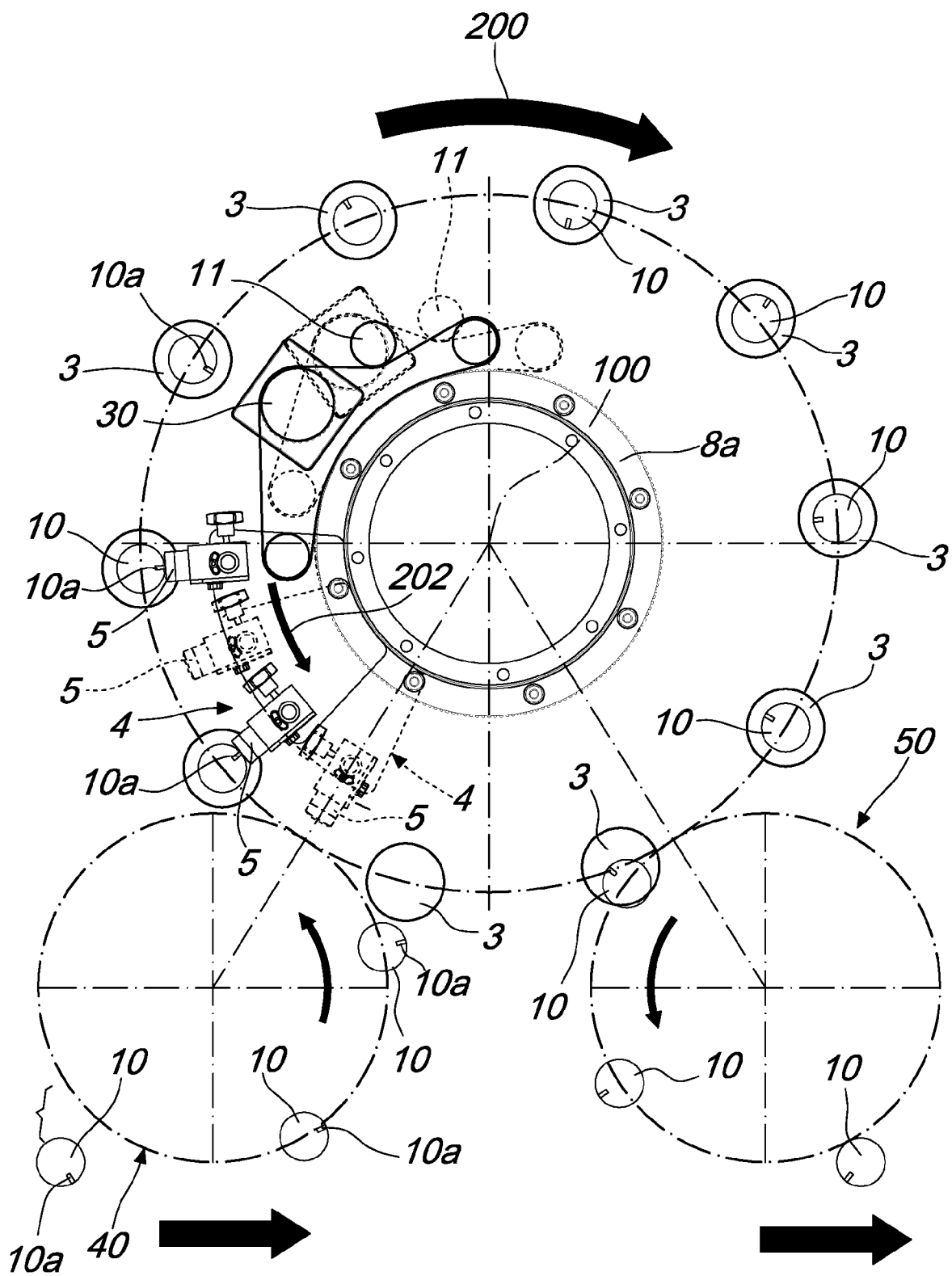
FIG. 3 is a view similar to FIG. 2 during the step of moving the sensor from the final position to the initial angular position.

Obviously, as shown in FIG. 3, while the sensor or sensors 5 return from the final angular position to the initial angular position, the base structure 2, and therewith the motor means 30, continue to rotate in the direction of rotation indicated with the arrow 200.

The dotted line in FIG. 3 in fact indicates the position of the sensors 5 and of the motor means 30 when the sensors 5 are returned to the initial angular position.

Preferably, the actuation body 31 comprises the output shaft of the actuation motor, providing the motor means 30, supported by the base structure 2.

Advantageously, the kinematic connection means 20 comprise a pinion element with an axis that is parallel to the rotation axis 100 of the carousel 1.

The pinion element is connected, in input (typically by way of keying), to the output shaft of the actuation motor and, in output, to a gearwheel, integral with the portion 8a of the supporting element 8 and extended around the rotation axis 100 of the carousel 1.

According to a possible embodiment, not shown in the figures, the connection element 9 can comprise the pinion element.

With reference to the embodiment shown in the figures, the connection element 9 comprises a closed annular body, constituted for example by a toothed belt, for connection between the pinion element and a pulley defining the portion 8a.

In particular, the toothed belt is partially wound around the pinion element and the pulley.

The tensioning of the toothed belt can be obtained using one or more belt tightening rollers 11.

Operation of the carousel 1 according to the disclosure is evident from the foregoing discussion.

When the sensor 5 is in the condition of detecting the orientation of the container 10, it is moved in rotation about the rotation axis 100 by the base structure 2 at the same angular speed as the base structure 2 thanks to the means 20 of kinematic connection between the motor means 30 and the sensor or sensors 5.

As explained previously, such movement, about the rotation axis 100, is obtained by keeping the output shaft of the actuation motor stationary and thus achieving, effectively, a rigid connection between the base structure 2 and the portion 8a of the supporting element 8 by way of the kinematic chain constituted by the pinion element (connected to the output shaft of the actuation motor), the toothed belt and the pulley.

It seems evident that the angular speed of the sensor 5, thanks to a such structural arrangement, corresponds perfectly to that of the base structure 2 (and thus of the container 10 to be monitored) without it being necessary to provide complex means of synchronization of the speed.

When the sensor 5 has reached the final angular position, the output shaft of the actuation motor is actuated in rotation, with the consequent rotation of the pinion element which entrains the toothed belt and makes the pulley rotate, in the direction indicated by the arrow 202, until the sensor 5 is returned to the initial angular position.

All the characteristics of the disclosure, indicated above as advantageous, convenient or similar, may also be missing or be substituted by equivalent characteristics.

The individual characteristics set out in reference to general teachings or to specific embodiments may all be present in other embodiments or may substitute characteristics in such embodiments.

In practice it has been found that in all the embodiments the disclosure is capable of fully achieving the set advantages and features.

The disclosure, thus conceived, is susceptible of numerous modifications and variations.

In practice, the materials employed, provided they are compatible with the specific use, and the dimensions and shapes, may be any according to requirements.

Moreover, all the details may be substituted by other, technically equivalent elements.

The invention claimed is:

1. A carousel for processing containers comprising a base structure that can rotate about the rotation axis of said carousel and supports a plurality of supporting elements that are mutually angularly spaced apart and are intended to support a respective container to be processed, said base structure being associated with at least one device for detecting the orientation of the containers carried by said supporting elements, said detection device comprising at least one sensor that can move about the rotation axis of said carousel between an initial angular position and a final angular position and vice versa, during movement from said initial angular position to said final angular position said at least one sensor being functionally associated with a container that moves about the rotation axis of said carousel and about a longitudinal axis thereof that is parallel to said rotation axis, in order to detect a feature of said container, wherein the carousel comprises kinematic connection means arranged between said base structure and said at least one sensor, which are adapted to couple integrally in rotation said at least one sensor and said base structure during the movement of said at least one sensor between said initial angular position and said final angular position, said kinematic connection means being associated with motor means adapted to return on command said at least one sensor from said final angular position to said initial angular position by way of an angular movement of said at least one sensor in the opposite direction with respect to the rotation of said base structure about the rotation axis of said carousel.

2. The carousel according to claim 1, wherein said motor means are supported by said base structure and rotate integrally with said base structure about said rotation axis.

3. The carousel according to claim 1, wherein said at least one sensor is supported by a supporting element that has at least one first portion that can rotate with respect to said base structure about the rotation axis of said carousel, said kinematic connection means comprising an element for kinematic connection between said first portion of said supporting element that is extended around the rotation axis of said carousel and an actuation body that is supported by said base structure.

4. The carousel according to claim 3, wherein said kinematic connection element is adapted to render rotationally integral said first portion of the supporting element at the same angular speed as said base structure during the movement of said at least one sensor from said initial angular position to said final angular position.

5. The carousel according to claim 3, wherein said actuation body can be actuated by said motor means in order to move said first portion of said supporting element in rotation in the opposite direction with respect to the rotation of said base structure about the rotation axis of said carousel in order to allow the passage of said sensor from said final angular position to said initial angular position.

6. The carousel according to claim 3, wherein said actuation body comprises an output shaft of an actuation motor that is supported by said base structure.

7. The carousel according to claim 6, further comprising a pinion element with an axis that is parallel to the rotation axis of the carousel and is connected in input to said output shaft and in output to a gearwheel extended around said rotation axis of the carousel and defining said at least one first portion.

8. The carousel according to claim 6, wherein said kinematic connection element comprises said pinion.

9. The carousel according to claim 3, wherein said kinematic connection element comprises a closed annular body.

10. The carousel according to claim 9, wherein said closed annular body comprises a toothed belt for connection between said pinion and said gearwheel.

\* \* \* \* \*